(12) United States Patent
Akbari-Dilmahani

(10) Patent No.: US 8,830,029 B2
(45) Date of Patent: *Sep. 9, 2014

(54) TRANSPONDER

(75) Inventor: Rahim Akbari-Dilmahani, Graz (AT)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/538,223

(22) Filed: Jun. 29, 2012

(65) Prior Publication Data

US 2013/0162395 A1    Jun. 27, 2013

(30) Foreign Application Priority Data

Jun. 30, 2011    (DE) .......................... 10 2011 051 456

(51) Int. Cl.
| | | |
|---|---|---|
| G05B 19/00 | (2006.01) | |
| H01Q 1/32 | (2006.01) | |
| H01Q 7/00 | (2006.01) | |
| G05B 1/01 | (2006.01) | |
| G06K 19/077 | (2006.01) | |

(52) U.S. Cl.
CPC ............... G05B 1/01 (2013.01); H01Q 1/3241 (2013.01); H01Q 7/00 (2013.01); G06K 19/07792 (2013.01)
USPC ... 340/5.61; 340/10.1; 340/10.34; 340/572.1; 340/5.2; 343/867; 235/375; 336/83

(58) Field of Classification Search
USPC ............... 340/572.1–572.9, 10.1, 10.34, 5.2, 340/5.61, 5.62; 343/867; 235/375–385; 336/83
See application file for complete search history.

(56) References Cited

U.S. PATENT DOCUMENTS

| | | | | |
|---|---|---|---|---|
| 6,970,679 | B2* | 11/2005 | Blatz et al. .................... | 455/41.1 |
| 6,989,750 | B2* | 1/2006 | Shanks et al. ............... | 340/572.4 |
| 7,142,090 | B2* | 11/2006 | Ueda et al. .................... | 340/5.61 |
| 7,692,529 | B2* | 4/2010 | Hagl et al. .................... | 340/5.61 |
| 2005/0237163 | A1* | 10/2005 | Lee et al. .................... | 340/10.51 |
| 2006/0286938 | A1* | 12/2006 | Murdoch ......................... | 455/73 |
| 2012/0280795 | A1* | 11/2012 | Akbari-Dilmaghani ..... | 340/10.1 |

* cited by examiner

Primary Examiner — George Bugg
Assistant Examiner — Edny Labbees
(74) Attorney, Agent, or Firm — North Weber & Baugh LLP

(57) ABSTRACT

A transponder is disclosed to receive a wireless electromagnetic query signal and transmit a corresponding wireless electromagnetic response signal. The transponder comprises a first coil and at least one further coil that function as antennas to receive the wireless electromagnetic query signal and generate separate wired electrical incoming signals. An axis of the first coil and an axis of the at least one further coil are differently aligned in space, and each coil is associated with at least one means for limiting the voltage of the respective incoming signal. The separate wired electrical incoming signals are rectified and converted to current signals. The peak values of the current signals are detected and compared, such that a control signal is generated to identify one coil between the first coil and the at least one further coil that has a larger peak value of current.

11 Claims, 2 Drawing Sheets

TRANSPONDER

CROSS REFERENCE TO RELATED APPLICATIONS

This application claims priority under 35 U.S.C. §119 to Germany Application No. 10 2011 051 456.2, filed Jun. 30, 2011, the subject matter of which is incorporated herein by reference.

BACKGROUND

A. Technical Field

The present invention relates to a transponder for receiving a wireless electromagnetic query signal and for sending a wireless electromagnetic response signal with a first coil acting as an antenna for generating a first wired electrical incoming signal from the query signal and with at least one further coil acting as an antenna for generating a further wired electrical incoming signal from the query signal, and wherein an axis of the first coil and an axis of the further coil have different alignments in space.

The object of the present invention seeks to improve a transponder of this kind.

The object is achieved by a transponder as described in the introduction in such a way that the coils are assigned at least one means for limiting the voltage of the respective incoming signals, and wherein the incoming signals are routed via a first full-wave rectifier, respectively, in order to generate a rectified incoming signal, and wherein the rectified incoming signals are routed to a current-controlled source of current, respectively, for generating a current signal that corresponds to the respective incoming signal, and wherein the current signals are routed to a peak value of current detector, respectively, for generating a peak value of current signal, and wherein the peak value of current signals are routed to a comparison arrangement for comparing the generated peak value of current signals, and wherein the comparison arrangement is configured for generating a control signal that indicates the strongest peak value of current signal of the generated peak value of current signals.

B. Background of the Invention

A transponder is understood to mean a transmission and receiving means that transmits, upon receiving a wireless electromagnetic query signal, a wireless electromagnetic response signal. The query signal therein is generated by a query device that is especially configured for this purpose and that is typically also configured to receive the response signal. Such combinations of transponders and query devices can be used, in particular, for purposes of keyless access control and/or keyless use control in motor vehicles.

Coils, in particular cylinder-shaped coils, can generally be used as antennas for receiving wireless electromagnetic signals, and wherein they essentially respond to the magnetic component of the field converting it to a wired electrical signal. However, therein they demonstrate a pronounced directional effect. If the axis of the coil is directed to the transmitter, there results an incoming minimum, if it is perpendicular in relation to the direction of the transmitter there results, on the other hand, an incoming maximum.

SUMMARY OF THE INVENTION

Since the transponder according to the invention, on the other hand, includes at least two coils with axes that are aligned differently in space, meaning they are not parallel, it is ensured that, independently of the position and the spatial orientation in relation of the query device that generates the query signal, at least one coil operates outside of the incoming minimum. This way, at least one wired electrical incoming signal is generated from the query signal having a level that is markedly above the incoming minimum level.

According to the invention, the coils are assigned at least one limiter means for limiting the voltage of the respective incoming signals. A limiter means for limiting a voltage is generally understood to mean an arrangement that processes one or multiple signals such that their respective voltage does not exceed a maximum voltage value. Presently, the limiter means can be configured such that it protects components downstream against high voltages that can occur when receiving strong query signals and/or interference signals. It is possible therein to provide each of the incoming signals with its own limiter means for limiting the voltage thereof. In the same way, it is possible to provide a common limiter means for multiple or for all incoming signals in order to limit the voltages thereof.

A full-wave rectifier is generally understood to mean a rectifier in which both half-waves of the supplied signal are provided with the same sign, thus producing a pulsating rectified signal that has a frequency of double of the frequency of the supplied signal. The full-wave rectifier can be a bridge-connected rectifier constituted of four diodes disposed in a Graetz rectifier. The invention envisions a first full-wave rectifier for each coil for generating a rectified incoming signal, whereby each incoming signal yields a rectified incoming signal that pulsates at double the frequency of the query signal and has amplitude variations based on a modulation of the query signal, if necessary.

The rectified incoming signals are supplied, respectively, to a current-controlled source of current. A current source therein is understood to mean a source of current that supplies a load-independent constant current on the output side, which is dependent on the control current that is supplied from the input side. Presently, from each of the rectified incoming signals, this results in the generation of one corresponding current signal, respectively, that also pulsates at double the frequency of the query signal and has, if necessary, amplitude variations based on a modulation of the query signal.

It is essential therein to note that the more energy the respectively assigned coil has taken up, the stronger are the current signals. This applies even if the voltages of several of the incoming signals are so high, respectively, that the limiter means for limiting the voltage of the incoming signals limits the incoming signals to the provided maximum value. In contrast to solutions that provide for evaluating the voltages of the incoming signals, with the transponder according to the invention, it is possible to ascertain which coils have taken up the highest energy from the transponder signal even if several of the incoming signals are so high that they are limited by the limiter means.

The current signals are now routed, respectively, to a peak value of current detector for generating a peak value of current signal. A peak value detector is generally understood to mean a detecting means for a peak value of a periodically changing order of magnitude. Presently, the peak value of current detectors serve for detecting the peak values of the pulsating current signals, which are thereafter contained as information as to the output signals of the peak value of current detectors. The peak value of current signals that are obtained in this way are all the stronger the more energy each assigned coil has taken up, respectively, from the query signal. Since, contrary to the current signals, the peak value of current signals generally do not pulsate and have no amplitude variations on the basis of a modulation of the query signal, they can be easily compared to each other.

To this end, the peak value of current signals of a comparison arrangement are supplied to generate a control signal, and wherein the control signal contains the information as to which of the compared peak value of current signals is the highest peak value of current signal, meaning which is the one having the greatest value. The control signal thus contains the information as to which of the coils is most favorably positioned and aligned in space for the relevant time period with regard to the query device that transmits the query signal. This way, it is possible to use the control signal for controlling a transmitter of the transponder in such a way that a response signal to the query signal is transmitted via the coil that is most favorably aligned for this purpose. This is possible even if several of the incoming signals are so strong that they are limited to the maximum value as provided by the limiter means.

According to an advantageous improvement of the invention, it is envisioned that the limiter means for limiting the voltage of the respective incoming signals per coil has a second full-wave rectifier for generating a supply voltage for the transponder, and wherein the second full-wave rectifier is parallel-circuited on the output side and connected to a voltage limiter for limiting the supply voltage. A voltage limiter for limiting a voltage is generally understood as an arrangement that processes signals in such a way that they do not exceed a maximum voltage value. By means of the parallel connection of the second full-wave rectifiers on the output side, a stable supply voltage is generated at their common output that is independent of the spatial arrangement of the transponder in relation to the query device. The voltage limiter therein prevents that the supply voltage exceeds a provided maximum value which, if occurring, could damage the transponder. Moreover, the voltage limiter that is connected on the output side to the full-wave rectifiers also limits the voltages of the incoming signals applied on the input side to the full-wave rectifiers in terms of their voltage. This way, it is possible to generate a stable and limited supply voltage for the transponder using only one voltage limiter and achieving, simultaneously, a limitation of the respective voltage of several incoming signals.

According to an advantageous improvement of the invention, a voltage smoothing means is assigned to the voltage limiter. This way, it is possible to reduce any fluctuations in the supply voltage that can result due to, for example, a modulation of the query signal, or even avoid them altogether. The voltage smoothing means can be embodied, in particular, by one or multiple capacitors that can be disposed parallel in relation to the voltage limiter.

According to an advantageous improvement of the invention, a total of two coils is provided, and wherein the comparison arrangement includes a comparator for comparing the peak value of current signals, and wherein an output signal of the comparator is the control signal. A comparator is generally a circuit for comparing two incoming signals. Depending on which of the two incoming signal is the greater signal, the output signal of the comparator assumes a first or a second value. Presently, the two possible values indicate which of the two coils currently takes up greater energy and is, therefore, positioned and aligned more favorably in relation to the query device. There results a simple construction of the transponder, and wherein the control signal is a binary control signal that can be easily processed. The comparator can be embodied by means of a conventional operational amplifier.

According to an advantageous improvement of the invention, more than two coils are provided, and wherein the comparison arrangement includes multiple comparators for comparing two of the peak value of current signals, respectively, and wherein the output signals of the comparators are supplied to a logic circuit having an output signal that is the control signal. A logic circuit therein is understood to mean a circuit for processing binary signals. The binary signals are presently generated by the comparators and routed to the logic circuit, and the same determines based thereupon which coils currently takes up the greatest energy and is, therefore, positioned and aligned most favorably in relation to the query device. This way, it is possible to detect the most favorably positioned coil in a simple manner, even if more than two coils are used. Due the use of any number of coils, which is now possible, the directional effect of the coils overall can be reduced further in contrast to a transponder having two coils. The comparators can be embodied as a conventional operational amplifier.

According to an advantageous improvement of the invention, a total of three coils are provided with their axes arranged perpendicularly in relation to each other. This creates a coil arrangement that has overall a very low directional effect, if any at all, whereby a query signals is reliably received at any spatial orientation of the transponder.

According to an advantageous improvement of the invention, the current-controlled sources of current are current minors that each generate, respectively, in addition to the current signal, at least one mirrored current signal, and wherein a summing element is provided for summing the mirrored current signals generated by the current minors in order to thus generate a pulsating composite signal the frequency of which corresponds to double the frequency of the query signal. A current minor is generally understood to mean a circuit that generates, from a reference current, at least two identical currents that can be tapped independently of each other. In the present case, the rectified incoming signals are, respectively, the reference signal of one of the current mirrors. The current mirrors supply, respectively, the current signal that is used, as described above, for detecting the most favorably positioned and aligned coil. In addition, each of the current mirrors supplies a mirrored current signal that corresponds to the current signal but that can be processed further independently of the same.

The mirrored current signals therein are summed up by means of a summing element, whereby a pulsating composite signal is generated having a frequency that is double the frequency of the query signal. The full-wave rectification therein ensures that the amounts of the incoming signals are summed up independently of their sign. This ensures that the incoming signals do not weaken each other or even cancel each other out during the adding action, which would be the case without rectification when the transponder is aligned such that one of the receiving coils is penetrated by the query signal in one direction and another of the receiving coils is penetrated by the query signal in another direction. In this case, the (non-rectified) incoming signal of the one coil and the (non-rectified) incoming signal of the other coil would have a phase displacement of 180° whereby, upon being summed up, the two incoming signals would cancel each other out either in part or, in extreme cases, completely. Complete cancellation would occur if the levels of the two incoming signals had the same value.

On the transponder according to the invention, on the other hand, each half-wave of each of the incoming signals is used to increase the level of the composite signal whereby, independently of the position and orientation of the transponder in space, a stable composite signal is generated in relation to the query device that generates the query signal. The frequency of the composite signal therein corresponds to double the frequency of the received query signal wherefore it can be used as time base signal, in particular for synchronizing the transponder with the query device.

Therefore, the transponder allows, aside from the detection of the coil having the most favorable alignment, for generating a time base signal, in particular from an amplitude-modulated query signal in which the amplitude is modified to transmit different values since the composite signal can be reliably generated even if the amplitude of the query signal is very small due to modulation.

According to an advantageous improvement of the invention, a comparator is provided for comparing the pulsating composite signal to a reference signal in order to thus generate a first clocking signal the frequency of which corresponds to double the frequency of the query signal. Comparing the composite signal with the reference signal by means of the comparator, yields a binary clocking signal on the output side of the comparator the frequency of which corresponds to double the frequency of the query signal, and wherein the binary clocking signal can be easily processed further. The comparator can be embodied by a conventional operational amplifier.

According to an advantageous improvement of the invention, the first clocking signal is supplied to a frequency divider in order to thus generate a second clocking signal having a lower frequency. A frequency divider generally means an arrangement that reduces the frequency of an incoming signal by a given factor, preferably by a factor that is an integer. The use of a frequency divider allows for generating the second clocking signal with a requirement-adjusted frequency, and wherein the information as to what is the frequency of the query signal is also contained in the second clocking signal.

According to an advantageous improvement of the invention, the frequency divider is a frequency-halving means, whereby the second clocking signal has the frequency of the query signal. In a frequency-halving means, the output signal generally has a frequency that corresponds to half of the frequency of the incoming signal. In the present instance, a second clocking signal is thus generated in an easy manner having a frequency that corresponds to the frequency of the query signal.

According to an advantageous improvement of the invention, the transponder is at least in part configured as a CMOS-integrated circuit. An integrated circuit is an integrated switching circuitry, meaning that an electronic circuit comprising multiple electronic components as well as the associated wiring is embodied on a common substrate, also referred to as a chip. It is possible to envision a fully integrated construction type wherein the totality of the electronic component elements of the transponder are disposed on exactly one substrate.

Moreover, the transponder according to the invention can also be manufactured in CMOS technology, meaning that PMOS transistors, so-called p-channel metal oxide semiconductor transistors, as well as NMOS transistors, so-called n-channel metal oxide semiconductor transistors, can be disposed on a common substrate.

BRIEF DESCRIPTION OF THE DRAWINGS

The invention and the improvements thereof will be described in further detail using the following figures. Shown are in.

DETAILED DESCRIPTION OF THE PREFERRED EMBODIMENTS

Figure 1:
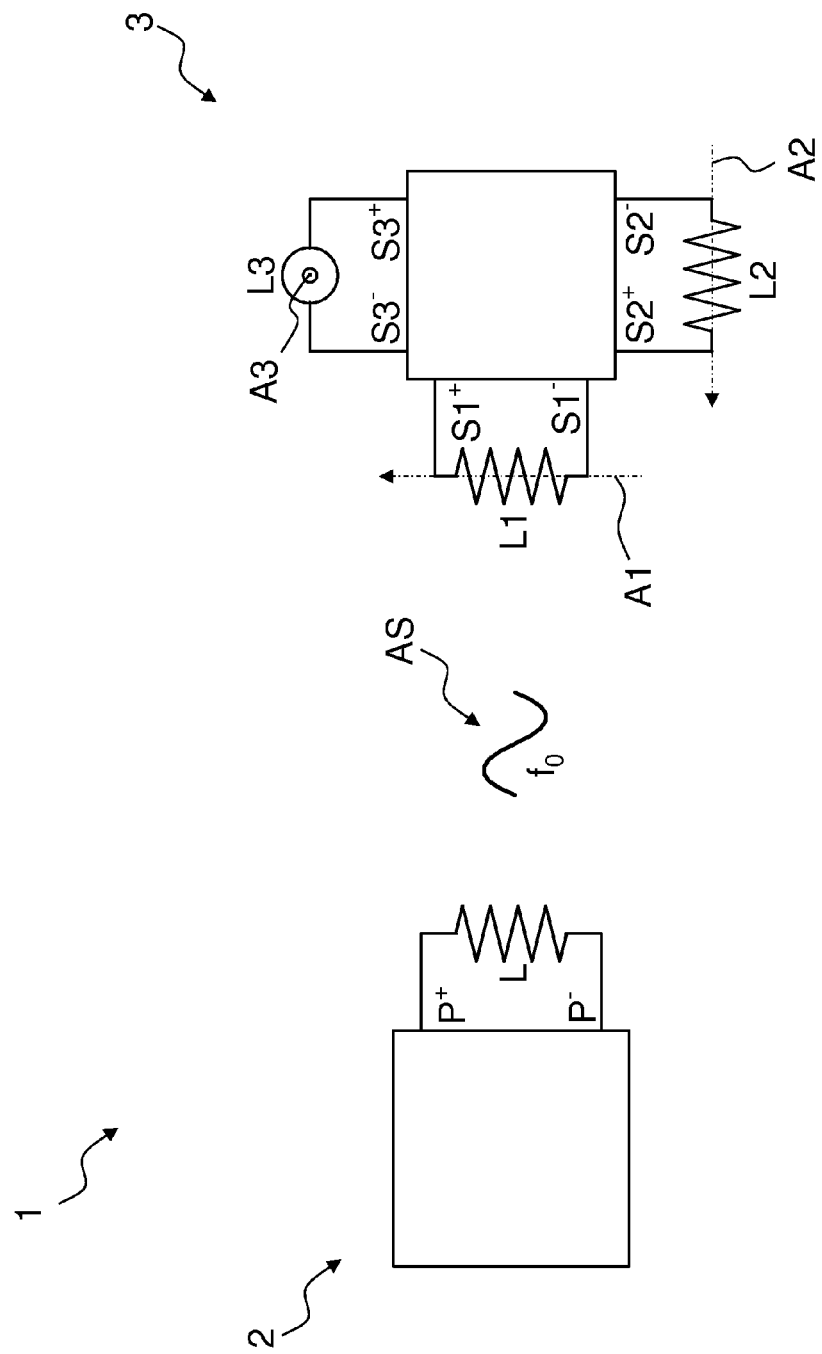
FIG. 1 an embodiment of a transponder according to the invention as well as an associated query device in a schematic depiction; and in FIG. 2 a circuit schematic of the transponder from FIG. 1.

FIG. 1 shows a transponder system 1 that consists of a query device 2 and a transponder 3. Any such combination 1 of query device 2 and transponder 3 can be used, in particular, for purposes of keyless access control and/or keyless use control of motor vehicles. Further applications are also conceivable.

In principle, the mode of operation is such that the query device 2 emits a wireless query signal AS having a frequency f0. If a transponder 3 is within range, the same receives the query signal AS, evaluates it and generates on its part a wireless response signal that is emitted by the transponder 3 and received as well as evaluated by the query device.

To this end, the query device 2 has at least one coil that acts as an antenna having the connections P+ and P–. The transponder 3 has, in particular, a first cylindrically shaped coil L1 that acts as an antenna having an axis A1 as well as connections S1+ and S1–; and, in particular, a second cylindrically shaped coil L2 that acts as an antenna having an axis A2 as well as connections S2+ and S2–; and, in particular, a third cylindrically shaped coil L3 that acts as an antenna having an axis A3 as well as connections S3+ and S3–.

The coils L1, L2, L3 each have their own marked directional effect. If the respective axis A1, A2, A3 of a coil L1, L2, L3 is directed toward the query device 2, there results an incoming minimum; if the same is perpendicular in relation to the direction of the query device 2, there results an incoming maximum.

Due to the fact that the axes A1, A2, A3 of the coils L1, L2, L3 are disposed at right angles in relation to each other, it is ensured that, independently of the position and alignment of the transponder 3 in space, at most one of the coils L1, L2, L3 is operated at an incoming minimum, and the two remaining coils L1, L2, L3 are operated at favorable conditions. In this manner, it is possible to receive query signals AS essentially independently of the position and spatial orientation of the transponder 3 in relation to the query device 2 that generates the query signal AS.

Figure 2:
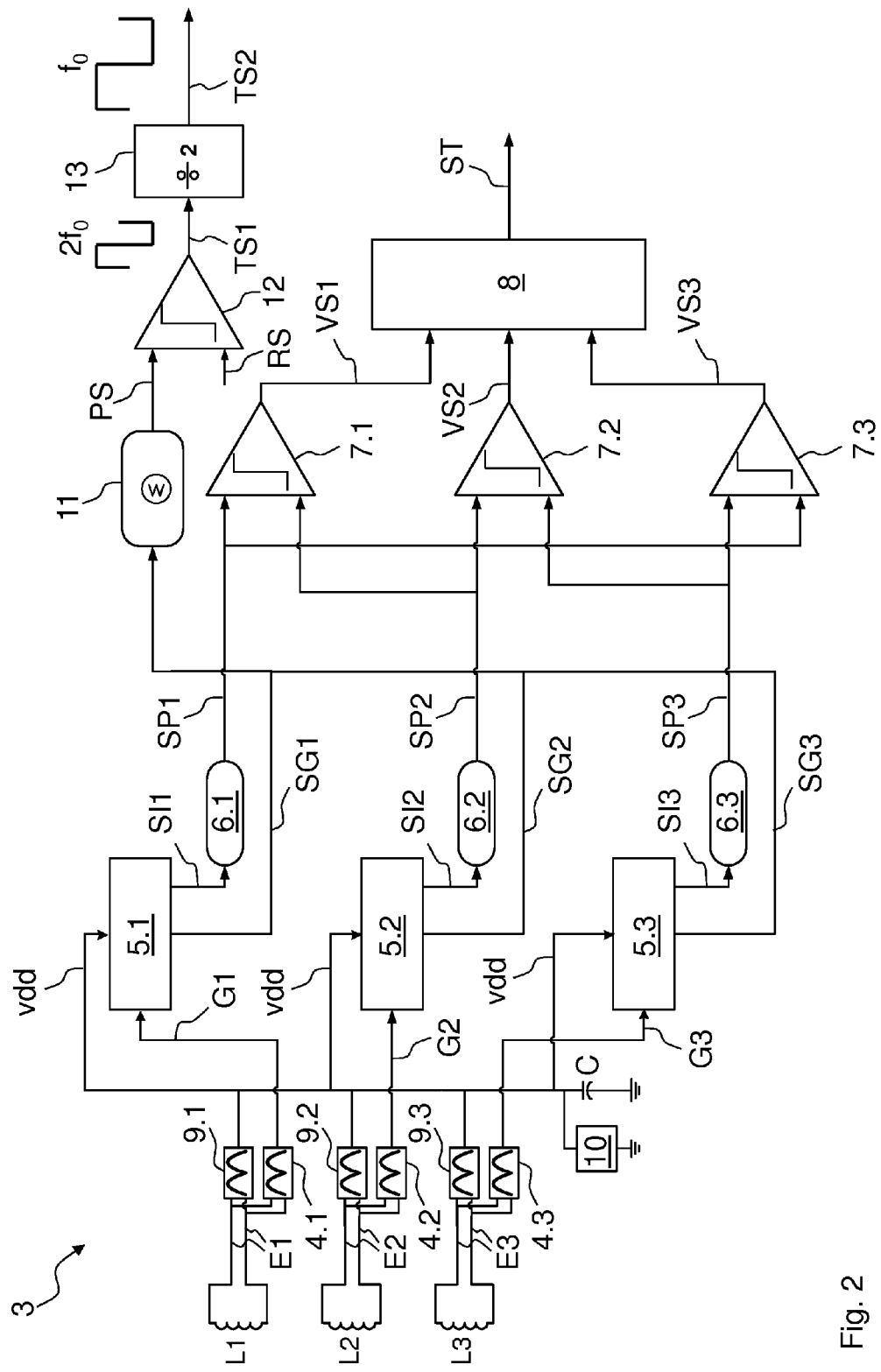

FIG. 2 shows a schematic circuit diagram of the transponder 1 from FIG. 1. Only the part of the circuit of the transponder 1 is shown therein that is essential for understanding the invention. The coils L1, L2, L3 are used as antennas for receiving the query signal AS, and wherein they respond essentially to the magnetic component of the query signal AS converting it, respectively, into a wired electrical incoming signal E1, E2, E3. Furthermore, the coils L1, L2, L3 are provided as antennas for sending a wireless electromagnetic response signal, and wherein the transmitter of transponder 3 is not shown therein.

Incoming signals E1, E2, E3 are routed, respectively, to a first full-wave rectifier 4.1, 4.2, 4.3 thus yielding from each incoming signal E1, E2, E3 a rectified incoming signal G1, G2, G3 that pulsates at double the frequency of the query signal AS and has, if necessary, amplitude variations based on a modulation of the query signals AS.

The rectified incoming signals G1, G2, G3 are supplied, respectively, to a current-controlled source of current 5.1, 5.2, 5.3 in order control the same. Presently, this generates from each of the rectified incoming signals G1, G2, G3 a corresponding current signal SI1, SI2, SI3, respectively, that also pulses at double the frequency of the query signal AS and has, if necessary, amplitude variations based on a modulation of the query signal AS.

The crucial aspect herein is that the more energy the respectively assigned coil L1, L2, L3 have taken up, the stronger are the current signals SI1, SI2, SI3.

The current signals SI1, SI2, SI3 are then routed to peak value of current detectors 6.1, 6.2, 6.3 for generating a peak value of current signal SP1, SP2, SP3. The peak value of current detectors 6.1, 6.2, 6.3 presently serve for detecting the peak values of the pulsating current signals SI1, SI2, SI3 that are then contained as information in the output signals, namely in the peak value of current signals SP1, SP2, SP3, of the peak value of current value detectors 6.1, 6.2, 6.3. The more energy the respectively assigned coil L1, L2, L3 have taken up from the query signal AS, the stronger are the peak values of current signals SI1, SI2, SI3. Since the peak values of current signals SI1, SI2, SI3 are generally not pulsating and do not have an amplitude variation based on a modulation of the query signal AS, contrary to the current signals SI1, SI2, SI3, they can be easily compared to each other.

To this end, the peak value of current signals SP1, SP2, SP3 are routed to a comparison arrangement 7.1, 7.2, 7.3, 8 for generating a control signal ST, and wherein the control signal ST contains the information as to which of the compared peak value of current signals SP1, SP2, SP3 contains the strongest peak value of current signal SP1, SP2, SP3, meaning the one with the greatest value. The control signal ST thus contains the information as to which of the coils L1, L2; L3 is most favorably positioned and aligned in space for the given relevant time period in relation to the query device 2 that transmits the query signal AS. Correspondingly, the control signal ST can be utilized for controlling a transmitter of a transponder 3 in such a way that a response signal to the query signal AS is transmitted via the most favorably aligned coil L1, L2, L3.

The embodiment envisions three coils L1, L2, L3, and wherein the comparison arrangement 7.1, 7.2, 7.3, 8 has three comparators 7.1, 7.2, 7.3 for comparing two of the peak values of current signals SP1, SP2, SP3 respectively, and wherein the output signals VS1, VS2, VS3 of the comparators 7.1, 7.2, 7.3 are routed to a logic circuit 8 having as its output signal the control signal ST.

In the embodiment, the coils L1, L2, L3 are assigned a limiter means 9.1, 9.2, 9.3, 10 for limiting the voltage of each of the incoming signals E1, E2, E3, respectively. A limiter means 9.1, 9.2, 9.3, 10 for limiting a voltage is generally understood to mean an arrangement that processes one or multiple signals in such a way that their respective voltage does not exceed a maximum voltage value. Presently, the limiter means 9.1, 9.2, 9.3, 10 can be configured to protect components downstream against high voltages that can occur when receiving strong query signals AS and/or interference signals. To this end, each of the incoming signals E1, E2, E3 can be provided with its own limiter means 9.1, 9.2, 9.3, 10 for limiting its voltage. However, in the embodiment, one common limiter means 9.1, 9.2, 9.3, 10 is provided for all incoming signals E1, E2, E3 for the purpose of limiting the voltages of the same.

The control signal ST contains information as to which of the coils L1, L2; L3 is most favorably positioned and aligned in space for the respectively given time period in relation to the query device 2 that transmits the query signal AS, even if the voltages of several of the incoming signals E1, E2, E3 are so high, respectively, that they are limited by the limiter means 9.1, 9.2, 9.3, 10 in order to limit the voltage of the incoming signals E1, E2, E3 to the provided maximum value. This is because, according to the invention, the currents of the incoming signals E1, E2, E3 are evaluated for detecting the most favorable coil L1, L2, L3—not the voltages of the incoming signals E1, E2, E3.

The embodiment provides that the limiter means 9.1, 9.2, 9.3, 10 has a second full-wave rectifier 9.1, 9.2, 9.3 for generating a supply voltage vdd for the transponder 3 for the purpose of limiting the voltage of the respective incoming signals E1, E2, E3 per coil L1, L2, L3, and wherein the second full-wave rectifiers 9.1, 9.2, 9.3 are parallel-circuited at the output side and connected to a voltage limiter 10 for limiting the supply voltage vdd. A voltage limiter 10 for limiting a voltage is generally understood to mean an arrangement that processes a signal in such a way that a maximum voltage value is not exceeded. Due to the parallel connection of the second full-wave rectifier 9.1, 9.2, 9.3 on the output side, a stable supply voltage vdd is generated at the common output of the same, independently of the spatial arrangement of the transponder 3 in relation to the query device 2. The voltage limiter 10 therein prevents that the supply voltage vdd exceeds a provided maximum value, which could otherwise result in damage to the transponder 3. Moreover, due to the voltage limiter 10 that is connected to the full-wave rectifiers 9.1, 9.2, 9.3 at the output side, the voltages applied to the incoming signals E1, E2, E3 applied to the full-wave rectifiers 9.1, 9.2, 9.3 are also limited. Correspondingly, with only one voltage limiter 10, it is possible to generate a stable and limited supply voltage vdd for the transponder 3 while, simultaneously, achieving a limiting action of the respective voltage of the incoming signals E1, E2, E3.

Advantageously, it is envisioned that a voltage smoothing means C be assigned to the voltage limiter 10. This way, it is possible to reduce any fluctuations of the supply voltage vdd that could result, for example, due to a modulation of the query signal AS, or avoid them altogether. In the embodiment, the voltage smoothing means C is embodied by the capacitor C, which can be disposed parallel in relation to the voltage limiter 10.

The embodiment provides that the current-controlled sources of current 5.1, 5.2, 5.3 be the current minors 5.1, 5.2, 5.3 that generate, respectively in addition to the current signal SI1, SI2, SI3, a mirrored current signal SG1, SG2, SG3, and wherein a summing element 11 is provided for summing up the mirrored current signals SG1, SG2, SG3 generated by means of the current mirror 5.1, 5.2, 5.3 in order to thus generate a pulsating summing PS the frequency of which corresponds to double the frequency of the query signal AS. In the present instance, the rectified incoming signals G1, G2, G3 are the reference signal of a current minor 5.1, 5.2, 5.3, respectively. The current minors 5.1, 5.2, 5.3 supply the current signal SP1, SP2, SP3, respectively, which is utilized, as described above, for detecting the most favorably positioned and aligned coil L1, L2, L3. Furthermore, the current mirror 5.1, 5.2, 5.3 supplies a mirrored current signal SG1, SG2, SG3 that corresponds to the current signal SI1, SI2, SI3 but can be processed further independently of the same.

The mirrored current signals SG1, SG2, SG3 therein are summed up by means of a summing element 11 in order to generate a pulsating composite signal PS the frequency of which corresponds to double the frequency of the query signal AS. The full-wave rectification therein ensures that the amounts of the incoming signals E1, E2, E3 are added up independently of their signs. This way, it is ensured that the incoming E1, E2, E3 do not weaken each other or even cancel each other out during the adding process, which would be the case without rectification if the transponder 3 were aligned such that one of the receiving coils L1, L2, L3 is penetrated by the query signal AS in the one direction and another of the receiving coils L1, L2, L3 is penetrated in another direction. In this instance, namely, the (non-rectified) incoming signal E1, E2, E3 of the one of the coils L1, L2, L3 and the (non-rectified) incoming signal E1, E2, E3 of the other of the coils L1, L2, L3 would have a phase displacement of 180° whereby, during the adding process, the two incoming signals E1, E2, E3 would cancel each other out either in part, or in extreme cases completely. Complete cancellation would occur therein if the levels by the two incoming signals E1, E2, E3 had the same value.

On the transponder according to the invention, on the other hand, each half-wave of each of the incoming signals E1, E2, E3 is utilized to increase the level of the composite signal PS wherefore, independently of the position and spatial orientation of the transponders 3 in relation to the query device 2 that generates the query signal AS, a stable composite signal PS is generated. The frequency of the composite signals PS therein corresponds to double the frequency of the received query signal AS, meaning it can be used as a time base signal, in particular for synchronizing the transponder 3 with the query device 2.

Aside from detecting the most favorably aligned coil L1, L2, L3, the transponder 3 thereby also allows for generating a time base signal, in particular from an amplitude-modulated query signal AS in which the amplitude is modified to transmit different values because the composite signal PS can also be reliably generated if the amplitude of the query signal AS is very small due to the modulation.

The composite signal PS is supplied to a comparator 12 that compares the pulsating composite signal PS to a reference signal RS in order to thus generate a first clocking signal TS1 the frequency of which corresponds to double the frequency of the query signal AS. A comparator 12 is generally a circuit for comparing two incoming signals PS, RS. Depending on which of the incoming signals PS, RS is greater, the output signal TS1 of the comparator 12 assumes a first or a second value. Due to the comparing action of the composite signal PS to a reference signal RS by means of the comparator 12, there results on the output side of the comparator 12 a binary clocking signal TS1 with a frequency that corresponds to double the frequency of the query signal AS, and wherein the binary clocking signal TS1 can be easily processed further. The comparator 12 can be embodied by a conventional operational amplifier.

Furthermore, the first clocking signal TS1 is routed to a frequency divider 13 in order to thus generate a second clocking signal TS2 having a lower frequency. A frequency divider 13 is generally understood to mean an arrangement that reduces the frequency of an incoming signal TS1 by a given factor, preferably by a factor that is an integer. The use of a frequency divider 13 makes it possible for the second clocking signal TS2 to be generated having a requirement-adjusted frequency, and wherein the second clocking signal TS2 also contains the information as to the frequency and phase of the query signal AS.

Preferably, the frequency divider 13 is a frequency-halving means 13. A frequency-halving means 13 generally has an output signal TS2 that corresponds to half of the frequency of the incoming signal TS1. In the present instance, a second clocking signal TS2 is thus easily generated that has a frequency which corresponds to the frequency of the query signal AS.

Preferably, the transponder 1 is at least in part configured as a CMOS-integrated circuit. An integrated circuit is an integrated switched circuitry, meaning that an electronic circuit comprises multiple electronic components as well as associated wiring that are embodied on a common substrate, also referred to as a chip. It is possible therein to envision a fully integrated construction in the context of which any and all electronic components of transponder 1 are disposed on exactly one substrate.

Furthermore, the transponder 1 according to the invention can be manufactured using CMOS technology, which means that the PMOS transistors, also referred to as a so-called p-channel metal oxide semiconductor transistors, as well as NMOS transistors, also referred to as the so-called n-channel metal oxide semiconductor transistors, can be disposed on a common substrate.

LIST OF REFERENCE SIGNS

1 Transponder system
2 Query device
3 Transponder
4.1 First full-wave rectifier for the first incoming signal
4.2 First full-wave rectifier for the second incoming signal
4.3 First full-wave rectifier for the third incoming signal
5.1 Current-controlled voltage source, current mirror for the first rectified incoming signal
5.2 Current-controlled voltage source, current mirror for the second rectified incoming signal
5.3 Current-controlled voltage source, current mirror for the third rectified incoming signal
6.1 Peak value of current detector, first current signal
6.2 Peak value of current detector, second current signal
6.3 Peak value of current detector, third current signal
7.1 First comparator of the comparison arrangement
7.2 Second comparator of the comparison arrangement
7.3 Third comparator of the comparison arrangement
8 Logic circuit
9.1 First full-wave rectifier for the first incoming signal
9.2 Second full-wave rectifier for the second incoming signal
9.3 Third full-wave rectifier for the third incoming signal
10 Voltage limiter
11 Summing element
12 Comparator
13 Frequency divider
L Coil of the query device
P Connections of the coil of the query device
AS Query signal
$f_0$ Frequency of the query signal
L1 First transponder coil
L2 Second transponder coil
L3 Third transponder coil
S1 First transponder coil connections
S2 Second transponder coil connections
S3 Third transponder coil connections
A1 First transponder coil axis
A2 Second transponder coil axis
A3 Third transponder coil axis
E1 First incoming signal
E2 Second incoming signal
E3 Third incoming signal
G1 Rectified first incoming signal
G2 Rectified second incoming signal
G3 Rectified third incoming signal
SI1 First current signal
SI2 Second current signal
SI3 Third current signal
SG1 First mirrored current signal
SG2 Second mirrored current signal
SG3 Third mirrored current signal
SP1 First peak value of current signal
SP2 Second peak value of current signal SP3 Third peak value of current signal
VS1 First output signal
VS2 Second output signal
VS3 Third output signal
ST Control signal
PS Pulsating composite signal
RS Reference signal
TS1 First binary clocking signal
TS2 Second binary clocking signal

What is claimed is:

1. A transponder, comprising: a first coil, coupled to receive a wireless electromagnetic query signal, the first coil acting as a first antenna and generating a first wired electrical incoming signal from the query signal; at least one further coil, coupled to receive the wireless electromagnetic query signal, the at least one further coil acting as a second antenna and generating a second wired electrical incoming signal from the query signal, an axis of the first coil and an axis of the at least one further coil having different spatial alignments, each of the first and at least one further coils being associated with at least one limiter means for limiting the voltages of the first and second wired electrical incoming signals; at least one full-wave rectifier, coupled to the first coil and the at least one further coil, the at least one full-wave rectifier generating a first rectified incoming signal and a second rectified incoming signal from the first and second wired electrical incoming signal, respectively; at least one current-controlled source of current, coupled to the at least one full-wave rectifier, the at least one current-controlled source of current generating a first current signal and a second current signal that correspond to the first and second rectified incoming signals, respectively; at least one current detector, coupled to the at least one current-controlled source of current, the at least one current detector detecting a first peak value of current signal and a second peak value of current signal that are associated with the peak values of the first and second current signals, respectively; a comparison arrangement, coupled to the at least one current detector, the comparison arrangement comparing the first and second peak value of current signals and generating a control signal, the control signal identifying one coil between the first coil and the at least one further coil that has a larger peak value of current.

2. The transponder according to claim 1, wherein the at least one limiter means includes a full-wave rectifier and a voltage limiter, the full-wave rectifier generating a supply voltage for the purpose of limiting the voltages of the first and second wired electrical incoming signals, the full-wave rectifier associated with each coil being parallel-circuited on the output side and further coupled to the voltage limiter for the purpose of limiting the supply voltage.

3. The transponder according to claim 1, wherein a voltage smoothing means is assigned to a voltage limiter included in the at least one limiter means.

4. The transponder according to claim 1, wherein a total of two coils are provided, the comparison arrangement including a comparator for comparing the peak values of the current signals, an output signal of the comparator is the control signal.

5. The transponder according to claim 1, wherein the at least one further coil is associated with at least two coils such that more than two coils are included in the transponder, the comparison arrangement includes comprising a plurality of comparators and a logic circuit, each comparator comparing two of a plurality of peak values of a plurality of current signals, output signals of the plurality of comparators being processed in the logic circuit to generate the control signal.

6. The transponder according to claim 1, wherein the transponder comprises a total of three coils, and an axis of each coil is disposed perpendicularly, in relation to the axes of the other two coils.

7. The transponder according to claim 1, wherein the at least one current-controlled source of current comprises at least one current mirrors that generates, in addition to the first and second current signals, a first mirrored current and a second mirrored current, and wherein a summing element is provided for summing up the first and second mirrored current and generating a pulsating composite signal that has a frequency doubling the frequency of the wireless electromagnetic query signal.

8. The transponder according to claim 7, wherein a comparator is provided for comparing the pulsating composite signal to a reference signal to generate a first clocking signal that has a frequency doubling the frequency of the wireless electromagnetic query signal.

9. The transponder according to claim 8 wherein the first clocking signal is converted to a second clocking signal having a lower frequency by a frequency divider.

10. The transponder according to claim 9, wherein the frequency divider is a frequency-halving means such that the frequency of the second clocking signal is equal to the frequency of the wireless electromagnetic query signal.

11. The transponder according to claim 1, wherein the transponder is at least in part executed as a CMOS-integrated circuit.

* * * * *